United States Patent
Kashihara et al.

(10) Patent No.: US 12,276,337 B2
(45) Date of Patent: Apr. 15, 2025

(54) ANNULAR METAL SEAL, ATTACHMENT STRUCTURE FOR ANNULAR METAL SEAL, AND ATTACHMENT METHOD FOR ANNULAR METAL SEAL

(71) Applicant: MITSUBISHI CABLE INDUSTRIES, LTD., Tokyo (JP)

(72) Inventors: Kazuyuki Kashihara, Arida (JP); Satoshi Toudou, Arida (JP)

(73) Assignee: MITSUBISHI CABLE INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/203,613

(22) Filed: May 30, 2023

(65) Prior Publication Data

US 2023/0383842 A1    Nov. 30, 2023

(30) Foreign Application Priority Data

May 30, 2022  (JP) ................................. 2022-087525

(51) Int. Cl.
  *F16J 15/06*    (2006.01)
(52) U.S. Cl.
  CPC ................................... *F16J 15/067* (2013.01)
(58) Field of Classification Search
  CPC ............. F16J 15/067; F16J 15/06; F16J 15/08
  See application file for complete search history.

(56) References Cited

U.S. PATENT DOCUMENTS

| | | | | |
|---|---|---|---|---|
| 7,828,301 | B2 * | 11/2010 | Briscoe | F16J 15/3216 285/368 |
| 7,866,669 | B2 * | 1/2011 | Kobayashi | F16J 15/062 277/584 |
| 11,365,808 | B2 * | 6/2022 | Groweg | E21B 17/16 |
| 2016/0076650 | A1 | 3/2016 | Armitage et al. | |
| 2019/0162305 | A1 | 5/2019 | Uemura et al. | |
| 2019/0264810 | A1 | 8/2019 | Andueza | |

FOREIGN PATENT DOCUMENTS

| | | |
|---|---|---|
| JP | S5856253 U | 4/1983 |
| JP | 2019-100362 A | 6/2019 |

* cited by examiner

*Primary Examiner* — Gilbert Y Lee
(74) *Attorney, Agent, or Firm* — Rabin & Berdo, P.C.

(57) ABSTRACT

In an attachment structure for an annular metal seal, an annular metal seal includes a seal body configured such that at least one of outer corner portions thereof corresponding to an inner corner portion of the seal groove has a sharp ridge, and in a state where a positioning ring is held between an inner-side side surface of the seal groove and an inner-diameter-side side surface or an outer-diameter-side side surface of the seal body, the annular metal seal is fitted in the seal groove with the positioning ring abutted on at least a portion of the inner-side side surface of the seal groove and the sharp ridge of the seal body spaced from the inner corner portion of the seal groove, and the first member and the second member are fastened with each other, so that inner and an outer sides of the annular metal seal are sealed.

17 Claims, 3 Drawing Sheets

ANNULAR METAL SEAL, ATTACHMENT STRUCTURE FOR ANNULAR METAL SEAL, AND ATTACHMENT METHOD FOR ANNULAR METAL SEAL

CROSS-REFERENCE TO RELATED APPLICATION

The present application is a continuation application filed under 35 U.S.C. 111(a) 5 claiming benefit under 35 U.S.C. 120 and 365(c) of Japanese Patent Application No. 2022-087525 filed on May 30, 2022, the entire contents of which are incorporated herein by reference.

BACKGROUND

1. Field of the Invention

The present disclosure relates to an annular metal seal, an attachment structure for an annular metal seal, and an attachment method for an annular metal seal.

2. Description of the Related Art

Conventionally, as illustrated in FIG. 4 and FIG. 5, an attachment structure 103 for an annular meatal seal, the attachment structure 103 including an annular metal seal 110 that is held between a first plane 101a of the first member 101 and a second plane 102a of a second member 102 and is pressed by bringing the first plane 101a and the second plane 102a closer to each other, has been known (see, for example, Japanese Unexamined Patent Publication No. 2019-100362, in particular, FIG. 3).

For example, as illustrated in FIG. 5, on the known annular metal seal 110, a plurality of ridges 111 to 114 are formed so as to be continuous in a circumferential direction. High contact pressure is generated between the annular metal seal 110 and each of the first plane 101a and the second plane 102a by reaction force generated in the annular metal seal 110, so that an inner side A and an outer side B of the annular metal seal 110 are blocked and a target fluid (gas, liquid, or the like) is sealed.

SUMMARY

The annular metal seal 110 is designed on a premise that the annular metal seal 110 is held between the first plane 101a and the second plane 102a. However, in actual use, in many cases, for example, as illustrated in FIG. 5, the annular metal seal 110 is fitted in a seal groove 104 formed by cutting in a first member 101 and is thus used and, because of a positional relationship between the annular metal seal 110 and the seal groove 104, the annular metal seal 110 is not fastened between the planes depending on cases.

That is, the ridge 111 that is one of the sharp ridges 111 to 114 of the annular metal seal 110 abuts on an inner corner portion (which will be hereinafter also referred to as an inner corner R) of the seal groove 104 in some cases. Normally, the inner corner R of the seal groove 104 is unavoidably formed into this shape in processing the seal groove 104 through machining. In this case, the following problems can arise.

(1) A position of the annular metal seal 110 is not stabilized when fastening is performed, and reaction force or contact surface pressure does not normally rise.

(2) The annular metal seal 110 slips in a radius direction at the inner corner R and damage occurs in a pass direction that connects areas that are to be sealed in, thus causing leakage.

In view of the foregoing, the present disclosure has been devised and it is therefore an object of the present disclosure to enable an annular metal seal to stably exhibit its original performance by reliably fastening the annular metal seal between planes.

In order to achieve the above-described object, according to the present disclosure, a ridge of an annular metal seal is forcibly spaced from a side wall of a seal groove by a predetermined distance.

Specifically, an attachment structure for an annular metal seal according to a first aspect of the present disclosure includes an annular metal seal, a first plane of a first member, a second plane of a second member, and an annular seal groove formed to be recessed in the first plane, and in the attachment structure for an annular metal seal, in a state where the annular metal seal is fitted in the annular seal groove of the first member, the annular metal seal is pressed by the second member to be deformed, so that an inner side and an outer side of the annular metal seal are sealed, and the annular metal seal includes a seal body configured such that at least one of outer corner portions thereof corresponding to an inner corner portion of the seal groove has a sharp ridge, and in a state where a positioning ring is held between an inner-side side surface of the seal groove and at least one of an inner-diameter-side side surface and an outer-diameter-side side surface of the seal body, the annular metal seal is fitted in the seal groove with the positioning ring abutted on at least a portion of the inner-side side surface of the seal groove and the sharp ridge of the seal body spaced from the inner corner portion of the seal groove, and the first member and the second member are fastened with each other to deform the annular metal seal, so that an inner side and an outer side of the annular metal seal are sealed.

According to the above-described structure, with the positioning ring held in a sandwiched manner as described above, the positioning ring is abutted on at least a portion of the inner-side side surface of the seal groove and a gap is ensured between the inner-side side surface and a tip end of the sharp ridge, so that the sharp ridge does not contact the inner corner portion of the seal groove. Therefore, a position of the annular metal seal is stabilized when fastening is performed, and reaction force or contact surface pressure normally rises. Moreover, the annular metal seal does not slip in a radius direction at the inner corner portion, no damage occurs in a pass direction that connects areas that are to be sealed in, and thus, leakage is not caused. It may be also meant by "the positioning ring is abutted on at least a portion of an inner-side side surface of the seal groove" that the positioning ring may be abutted on the inner-side side surface of the seal groove not on an entire circumference thereof but partially on a circumferential direction.

In a second aspect of the present disclosure, in the first aspect, a thickness of the positioning ring in a radius direction is equal to or larger than a radius of the inner corner portion of the seal groove.

According to the above-described structure, the positioning ring is abutted on at least a portion of the inner-side side surface of the seal groove, so that the sharp ridge of the annular metal seal is reliably spaced from the inner corner portion (inner corner R).

In a third aspect of the present disclosure, in the first or second aspect, a height of the positioning ring is equal to or larger than a value obtained by subtracting a radius of the inner corner portion of the seal groove from a depth of the seal groove and is equal to or smaller than times a height of the annular metal seal.

According to the above-described structure, the positioning ring having an appropriate height is held in a sandwiched manner as described above, so that the sharp ridge of the annular metal seal is reliably spaced from the inner corner portion (inner corner R).

An attachment method for an annular metal seal according to a fourth aspect of the present disclosure is an attachment method for an annular metal seal in which, in a state where an annular metal seal is fitted in an annular seal groove of a first member, the annular metal seal is pressed by a second member to be deformed, so that an inner side and an outer side of the annular metal seal are sealed, and includes preparing an annular metal seal that includes a seal body configured such that at least one of outer corner portions thereof corresponding to an inner corner portion of the seal groove has a sharp ridge and a positioning ring having a smaller outer diameter than an inner diameter of the seal body or a positioning ring having a larger inner diameter than an outer diameter of the seal body, fitting the annular metal seal in the seal groove with the positioning ring abutted on at least a portion of an inner-side side surface of the seal groove and the sharp ridge of the seal body spaced from the inner corner portion of the seal groove, and sealing an inner side and an outer side of the annular metal seal by fastening the first member and the second member to each other to deform the annular metal seal.

According to the above-described structure, with the positioning ring held in a sandwiched manner as described above, the positioning ring is abutted on at least a portion of the inner-side side surface of the seal groove and a gap is ensured between the inner-side side surface and the tip end of the sharp ridge, so that the sharp ridge does not contact the inner corner portion of the seal groove. Therefore, the position of the annular metal seal is stabilized when fastening is performed, and reaction force or contact surface pressure normally rises. Moreover, the annular metal seal does not slip in a radius direction at the inner corner portion, no damage occurs in a pass direction that connects areas that are to be sealed in, and thus, leakage is not caused.

According to a fifth aspect of the present disclosure, an annular metal seal that is fitted in an annular seal groove of a first member and thus is pressed by a second member to be deformed is provided, the annular metal seal includes a seal body configured such that at least one of outer corner portions thereof corresponding to an inner corner portion of the seal groove has a sharp ridge and a positioning protrusion expansively protruding from at least one of an inner-diameter-side side surface and an outer-diameter-side side surface of the seal body, and a gap that prevents contact with an inner corner portion of the seal groove is provided between a an inner-side side surface of the seal groove and a tip end of the sharp ridge.

According to the above-described structure, with the positioning protrusion provided, the positioning protrusion is abutted on at least a portion of the inner-side side surface of the seal groove and a gap is ensured between the inner-side side surface and the tip end of the sharp ridge, so that the sharp ridge does not contact the inner corner portion of the seal groove. Therefore, the position of the annular metal seal is stabilized when fastening is performed, and reaction force or contact surface pressure normally rises. Moreover, the annular metal seal does not slip in a radius direction at the inner corner portion, no damage occurs in a pass direction that connects areas that are to be sealed in, and thus, leakage is not caused. It may be also meant by "the positioning protrusion is abutted on at least a portion of an inner-side side surface of the seal groove" that the positioning protrusion may be abutted on the inner-side side surface of the seal groove not on an entire circumference thereof but partially on a circumferential direction.

In a sixth aspect of the present disclosure, in the fifth aspect, the seal body has an X-shaped cross section, and the positioning protrusion is provided in middle of at least one of the inner-diameter-side side surface and the outer-diameter-side side surface of the seal body in a height direction.

According to the above-described structure, the sharp ridge can be reliably prevented from contacting the inner corner portion of the seal groove by a simple structure.

An attachment structure for an annual metal seal according to a seventh aspect of the present disclosure includes an annular metal seal, a first plane of a first member, a second plane of a second member, and an annular seal grove formed to be recessed in the first plane, and in the attachment structure for an annular metal seal, in a state where the annular metal seal is fitted in the annular seal groove of the first member, the annular metal seal is pressed by the second member to be deformed, so that an inner side and an outer side of the annular metal seal are sealed, the annular metal seal includes a seal body configured such that at least one of outer corner portions thereof corresponding to an inner corner portion of the seal groove has a sharp ridge and a positioning protrusion expansively protruding from at least one of an inner-diameter-side side surface and an outer-diameter-side side surface of the seal body, the annular metal seal is fitted in the seal groove with the positioning protrusion abutted on at least a portion of an inner-side side surface of the seal groove and the sharp ridge of the seal body spaced from the inner corner portion of the seal groove, and the first member and the second member are fastened with each other to deform the annular metal seal, so that an inner side and an outer side of the annular metal seal are sealed.

According to the above-described structure, with the positioning protrusion provided, the positioning protrusion is abutted on at least a portion of the inner-side side surface of the seal groove and a gap is ensured between the inner-side side surface and the tip end of the sharp ridge, so that the sharp ridge does not contact the inner corner portion of the seal groove. Therefore, the position of the annular metal seal is stabilized when fastening is performed, and reaction force or contact surface pressure normally rises. Moreover, the annular metal seal does not slip in a radius direction at the inner corner portion, no damage occurs in a pass direction that connects areas that are to be sealed in, and thus, leakage is not caused.

In an eighth aspect of the present disclosure, in the seventh aspect, a protrusion amount of the positioning protrusion in a radius direction is equal to or larger than a radius of the inner corner portion of the seal groove.

According to the above-described structure, the positioning protrusion is abutted on at least a portion of the inner-side side surface of the seal groove, so that the sharp ridge of the annular metal seal is spaced from the inner corner portion (inner corner R).

In a ninth aspect of the present disclosure, in the seventh or eighth aspect, a height of the positioning protrusion is equal to or larger than a value obtained by subtracting twice a radius of the inner corner portion of the seal groove from a height of the annular metal seal and is equal to or smaller than 0.75 times the height of the annular metal seal.

According to the above-described structure, with the positioning protrusion having an appropriate height provided, the sharp ridge of the annular metal seal is spaced from the inner corner portion (inner corner R).

An attachment method for an annular metal seal according to a tenth aspect of the present is an attachment method for an annular metal seal in which, in a state where an annular metal seal is fitted in an annular seal groove of a first member, the annular metal seal is pressed by a second member to be deformed, so that an inner side and an outer side of the annular metal seal are sealed, includes preparing an annular metal seal that includes a seal body configured such that at least one of outer corner portions thereof corresponding to an inner corner portion of the seal groove has a sharp ridge and a positioning protrusion expansively protruding from at least one of an inner-diameter-side surface and an outer-diameter-side side surface of the seal body and in which a gap is provided between an inner-side side surface of the seal groove and a tip end of the sharp ridge, fitting the annular metal seal in the seal groove with the positioning protrusion abutted on at least a portion of the inner-side side surface of the seal groove and the sharp ridge of the seal body spaced from the inner corner portion of the seal groove, and sealing an inner side and an outer side of the annular metal seal by fastening the first member and the second member to each other to deform the annular metal seal.

According to the above-described structure, with the positioning protrusion provided, the positioning protrusion is abutted on at least a portion of the inner-side side surface of the seal groove and a gap is ensured between the inner-side side surface and the tip end of the sharp ridge, so that the sharp ridge does not contact the inner corner portion of the seal groove. Therefore, the position of the annular metal seal is stabilized when fastening is performed, and reaction force or contact surface pressure normally rises. Moreover, the annular metal seal does not slip in a radius direction at the inner corner portion, no damage occurs in a pass direction that connects areas that are to be sealed in, and thus, leakage is not caused.

DETAILED DESCRIPTION

Embodiments of the present disclosure will be described below with reference to the accompanying drawings.

First Embodiment

Figure 1:
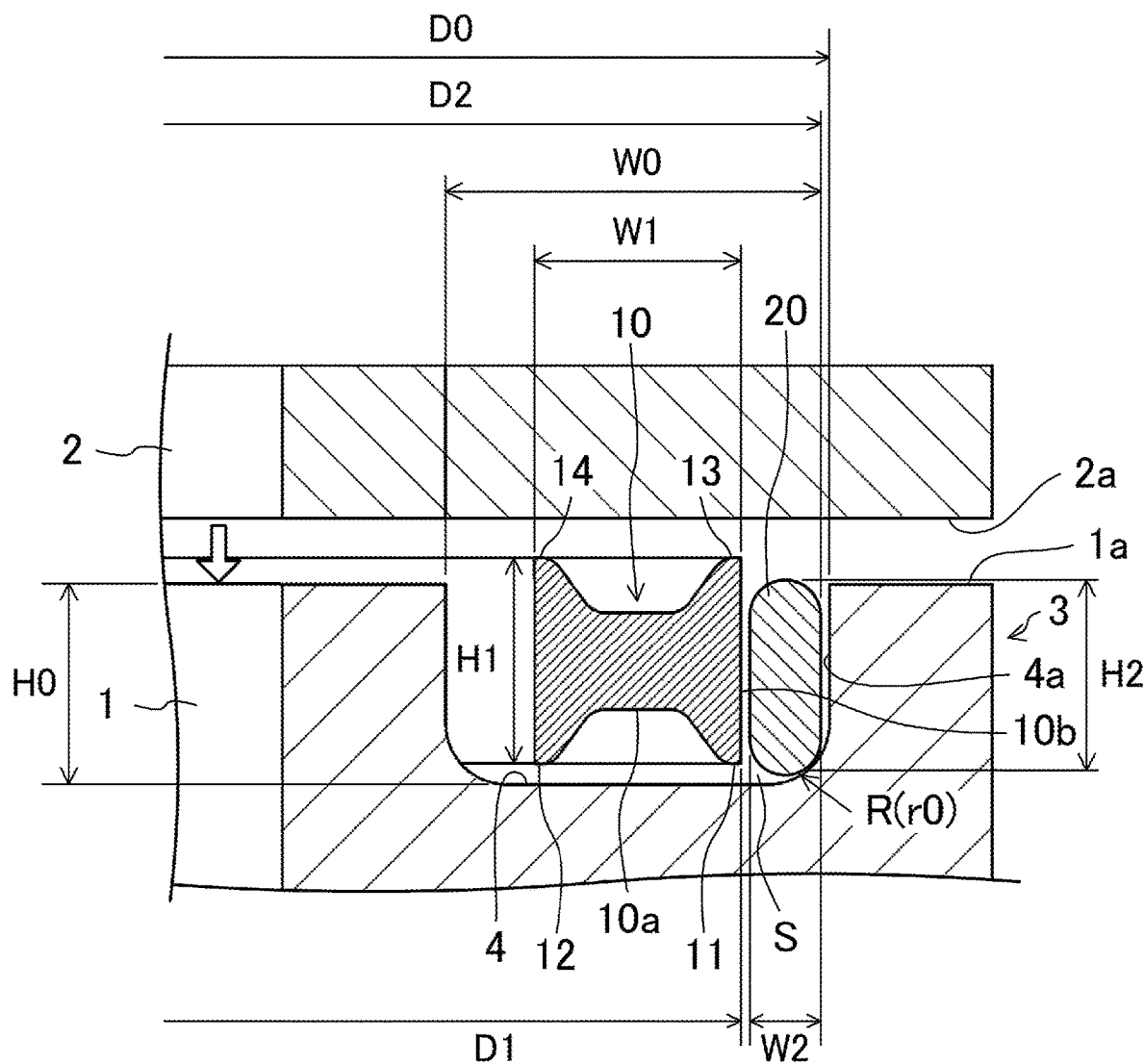
FIG. 1 is an enlarged cross-sectional view taken along the line I-I of FIG. 2.
Figure 2:
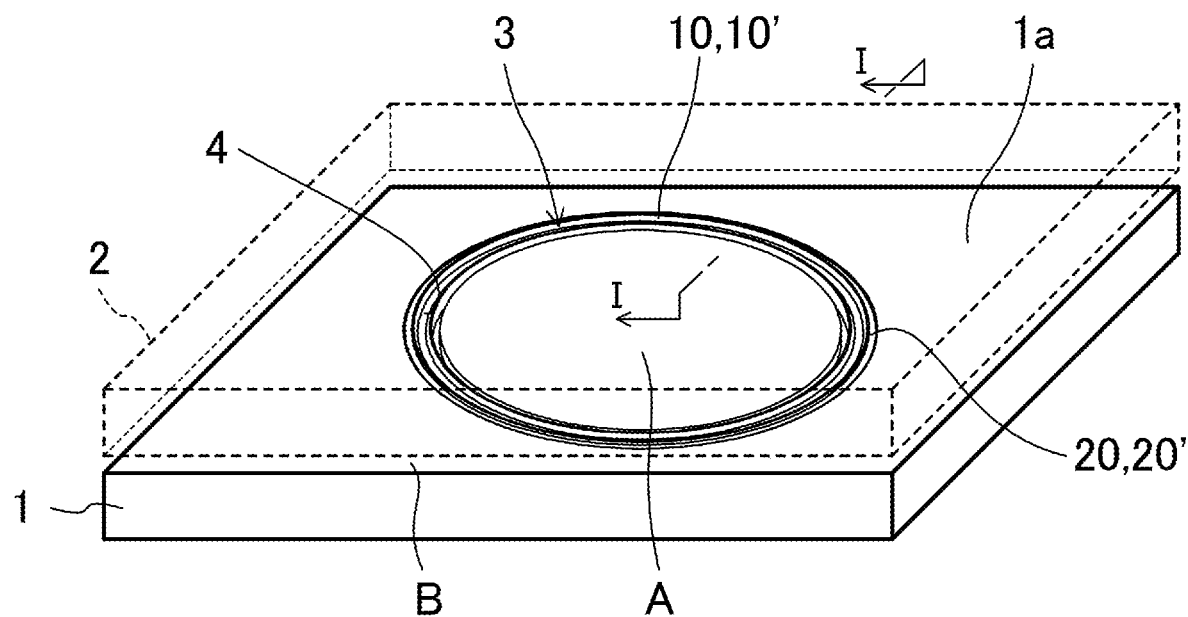
FIG. 2 is a perspective view illustrating an annular metal seal and a surrounding portion thereof according to a first embodiment.

FIG. 1 and FIG. 2 illustrate an attachment structure 3 for an annular metal seal, the attachment structure 3 including an annular metal seal 10 according to a first embodiment of the present disclosure.

In the attachment structure 3 for an annular metal seal, in a state where the annular metal seal 10 is fitted in an annular seal groove 4 of a first member 1, the annular seal groove 4 being formed to be recessed in a first plane 1$a$ of the first member 1, the annular metal seal 10 is pressed by a second member 2 to be deformed, so that an inner side A and an outer side B of the annular metal seal 10 are sealed between the first plane 1$a$ and a second plane 2$a$. In this embodiment, configurations of the first member 1 and the second member 2 will not be specifically described, but each of the first member 1 and the second member 2 is, for example, a flange portion in a connection portion between a pair of pipes.

The annular metal seal 10 of this embodiment includes a seal body 10$a$ that includes, for example, four ridges 11, 12, 13, and 14 each having a sharp outer corner portion, in upper and lower portions of side surfaces. The annular metal seal 10 is formed of, for example, stainless steel, a nickel alloy, copper, or the like. In this embodiment, the seal body 10$a$ is an X ring including the four ridges 11, 12, 13, and 14 and having an X-shaped cross section, but a cross section thereof is not limited thereto.

In the attachment structure 3 for an annular metal seal according to this embodiment, as illustrated in FIG. 1, in a state where the positioning ring 20 is held between an inner-side side surface 4$a$ of the seal groove 4 and an outer diameter-side side surface 10$b$ of the seal body the annular metal seal 10 is fitted in the seal groove 4 with a positioning ring 20 abutted on the inner-side side surface 4$a$ of the seal groove 4 and the sharp ridge 11 of the seal body 10$a$ spaced from an inner corner portion (which will be hereinafter also referred to as an inner corner R) of the seal groove 4. In this state, the first member 1 and the second member 2 are fastened with each other to deform the annular metal seal 10, so that the inner side A and the outer side B of the annular metal seal 10 are sealed.

Note that, although not illustrated, the positioning ring 20 may be abutted on the inner-side side surface 4$a$ of the seal groove 4 in a state where the positioning ring 20 is held between the inner-side side surface 4$a$ of the seal groove 4 and an inner-diameter-side side surface of the seal body 10$a$.

Herein, a thickness W2 of the positioning ring 20 in a radius direction is equal to or larger than a radius r0 of the inner corner R of the seal groove 4 (W2≥r0). A height H2 of the positioning ring 20 is equal to or larger than a value obtained by subtracting the radius r0 of the inner corner R of the seal groove 4 from a depth H0 of the seal groove 4 and is equal to or lower than 0.75 times a height H1 of the annular metal seal 10 (H0−r≤H2≤0.75H1). In order to make the annular metal seal 10 to exhibit its function, it is preferable to form the positioning ring 20 to satisfy the above-described dimensional relation.

As a working example, for the seal groove 4, dimensions are as follows: an outer diameter D0=17.80 mm, a groove depth H0=0.7 mm, and a groove width W0≥1.5 mm. For the annular metal seal 10, dimensions are as follows: an outer diameter D1=17.0 mm, a height H1=0.8 mm, and a thickness in the radius direction W1=0.8 mm. For the positioning ring 20, dimensions are as follows: an outer diameter D2=17.65 mm, a height H2=0.6 mm, and a thickness in the radius direction W2=0.25 mm.

In this embodiment, the sharp ridge 11 of the annular metal seal 10 is configured to be reliably spaced from the inner corner R by providing the positioning ring 20 such that the positioning ring 20 is held in a sandwiched manner in an appropriate dimensional relation.

—Attachment Method for Annular Metal Seal—

First, as the annular metal seal 10 of this embodiment, the seal body 10$a$ and the positioning ring 20 are prepared.

Next, in a state where the positioning ring 20 is abutted on the inner-side side surface 4a of the seal groove 4 and the sharp ridge 11 of the seal body 10a is spaced from the inner corner R of the seal groove 4, the annular metal seal 10 is fitted in the seal groove 4.

Next, the first member 1 and the second member 2 are fastened to each other to deform the annular metal seal 10, thereby sealing the inner side A and the outer side B of the annular metal seal 10 between the first plane 1a and the second plane 2a.

At this time, in this embodiment, by providing the positioning ring 20 such that the positioning ring 20 is held in a sandwiched manner, the positioning ring 20 is abutted on the inner-side side surface 4a of the seal groove 4 and a gap S is ensured between the inner-side side surface 4a and a tip end of the sharp ridge 11, so that the sharp ridge 11 does not contact the inner corner R of the seal groove 4. Therefore, a position of the annular metal seal 10 is stabilized when fastening is performed, and reaction force or contact surface pressure normally rises. Moreover, the annular metal seal 10 does not slip in the radius direction at the inner corner R, no damage occurs in a pass direction that connects areas that are to be sealed in, and thus, leakage is not caused.

As has been described above, according to this embodiment, an original performance of the annular metal seal 10 can be stably exhibited by reliably fastening the annular metal seal 10 between the first plane 1a and the second plane 2a.

Note that, in general, a back-up ring is for preventing projection from a groove of an O ring or the like and biting into a gap, in general, has a height equal to or larger than a depth of the groove, and is thus different from the positioning ring 20 of this embodiment.

Second Embodiment

Figure 3:
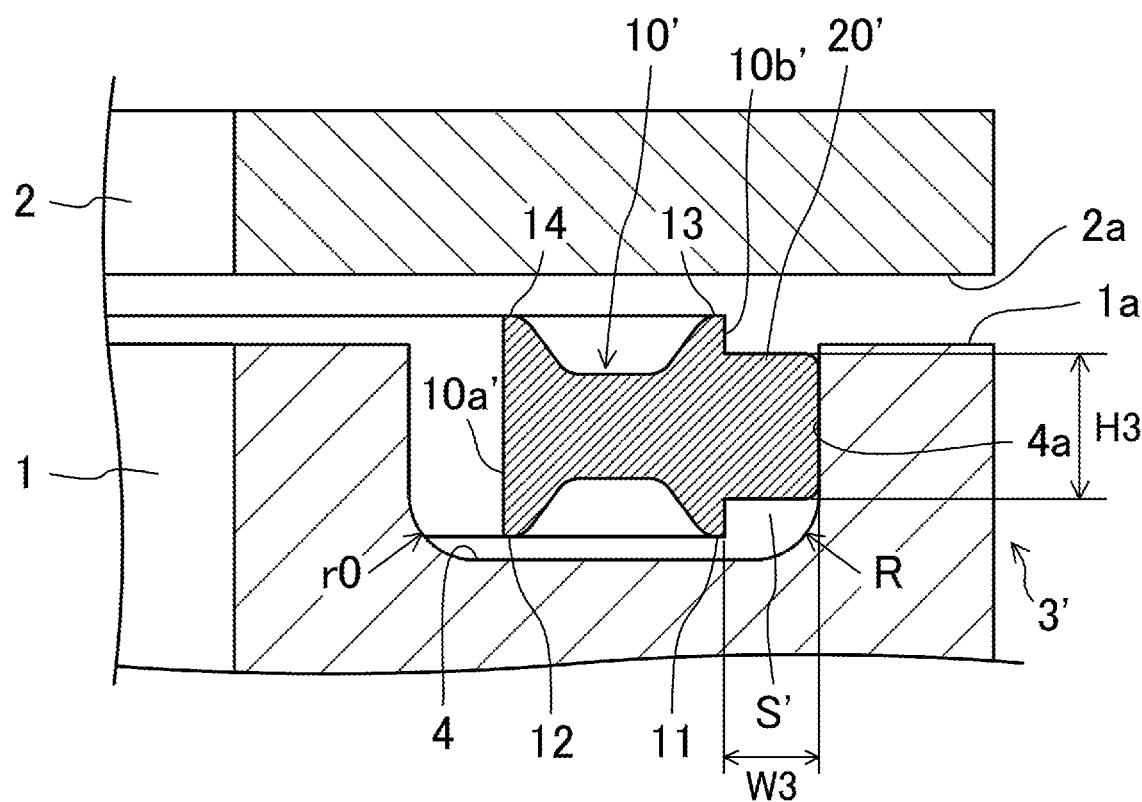
FIG. 3 is a cross-sectional view corresponding to FIG. 1 according to a second embodiment.
Figure 4:
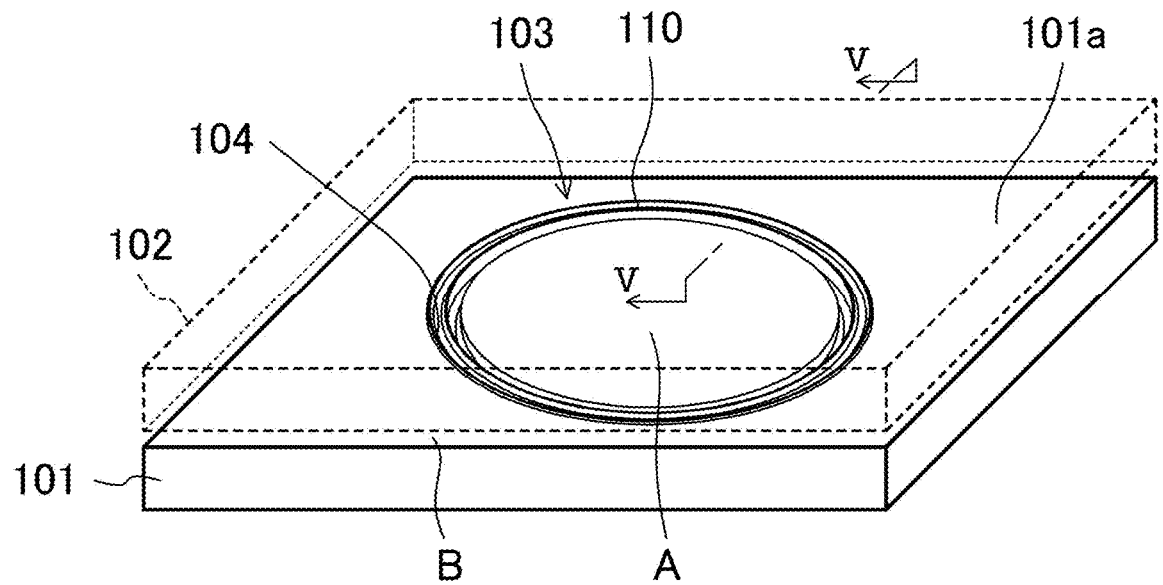
FIG. 4 is a perspective view illustrating an outline of a fastening structure for an annular metal seal according to a known example.
Figure 5:
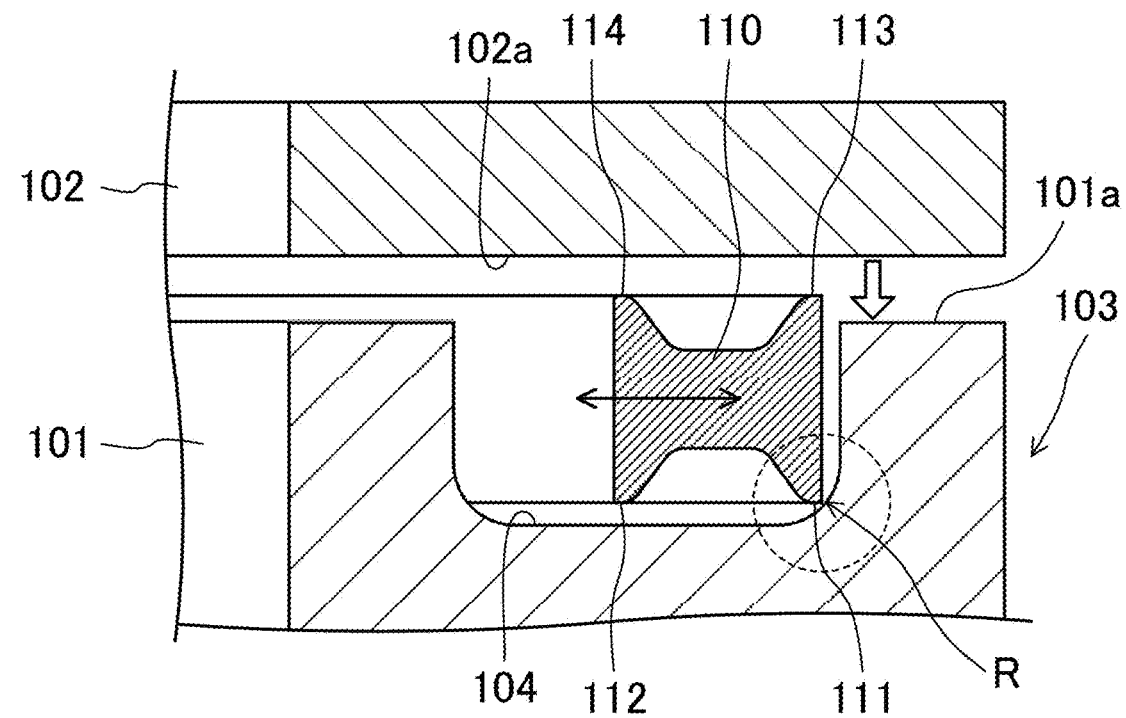
FIG. 5 is an enlarged cross-sectional view taken along the line V-V of FIG. 4.

FIG. 3 illustrates a second embodiment of the present disclosure. The second embodiment is different from the first embodiment in that a configuration of the second embodiment does not include the positioning ring 20. Note that, in this embodiment, each component that is identical to a component illustrated in FIG. 1 and FIG. 2 is denoted by the same reference character as that used in FIG. 1 and FIG. 2, and the detailed description thereof will be omitted.

Specifically, in this embodiment, an annular metal seal 10' itself is characteristic, and the positioning ring 20 is not held in a sandwiched manner but a protrusion is provided in an annular metal seal 10' side.

That is, a positioning protrusion 20' expansively protrudes from at least one of inner-diameter-side and outer-diameter-side side surfaces of a seal body 10a'. In this embodiment, as illustrated in FIG. 3, the positioning protrusion 20' expansively protrudes from the outer-diameter-side side surface 10b' of the seal body 10a'.

The seal body 10a' has an X-shaped cross section, and the positioning protrusion 20' is provided in middle of the outer-diameter-side side surface 10b' of the seal body 10a' in the height direction.

A protrusion amount W3 of the positioning protrusion 20' in the radius direction is equal to or larger than the radius r0 of the inner corner R of the seal groove 4 (W3≥r0).

A height H3 of the positioning protrusion 20' is equal to or larger than a value subtracting double of the radius r0 of the inner corner R of the seal groove 4 from the height H1 of the annular metal seal 10' and is equal to or less than 0.75 times the height H1 of the annular metal seal 10 (H1−2r0≤H3≤0.75H1).

In an attachment structure 3' for an annular metal seal according to this embodiment, in a state where the positioning protrusion 20' is abutted on the inner-side side surface 4a of the seal groove 4 and a sharp ridge 11 of the seal body 10a' is spaced from the inner corner R of the seal groove 4, the annular metal seal 10' is fitted in the seal groove 4 and the first member 1 and the second member 2 are fastened to each other to deform the annular metal seal 10', thereby sealing the inner side A and the outer side B of the annular metal seal 10'. Then, a gap S' that prevents contact with the inner corner R of the seal groove 4 is provided between the inner-side side surface 4a and the tip end of the sharp ridge 11.

—Attachment Method for Annular Metal Seal—

First, the annular metal seal 10' including the positioning protrusion 20' expansively protruding from the outer-diameter-side side surface 10b' of the annular metal seal 10' is prepared.

Next, in a state where the positioning protrusion 20' is abutted on the inner-side side surface 4a of the seal groove 4 and the sharp ridge 11 of the seal body 10a' is spaced from the inner corner R of the seal groove 4, the annular metal seal 10' is fitted in the seal groove 4. At this time, the positioning protrusion 20' is abutted on the inner-side side surface 4a of the seal groove 4 and the protrusion amount W3 of the positioning protrusion 20' in the radius direction is equal to or larger than the radius r0 of the inner corner R of the seal groove 4, so that the sharp ridge 11 of the annular metal seal 10' is reliably spaced from the inner corner R.

Next, the first member 1 and the second member 2 are fastened to each other to deform the annular metal seal 10', thereby sealing an inner side A and an outer side B of the annular metal seal 10' between the first plane 1a and the second plane 2a.

In this embodiment, the positioning protrusion 20' is abutted on the inner-side side surface 4a of the seal groove 4 and the gab S' is ensured between the inner-side side surface 4a and the tip end of the sharp ridge 11, so that the sharp ridge 11 does not contact the inner corner R of the seal groove 4.

Therefore, a position of the annular metal seal 10' is stabilized when fastening is performed, and reaction force or contact surface pressure normally rises.

Moreover, the annular metal seal 10' does not slip in the radius direction at the inner corner R, no damage occurs in a pass direction that connects areas that are to be sealed in, and thus, leakage is not caused.

Accordingly, also in the annular metal seal 10' according to this embodiment, an original performance of the annular metal seal 10' can be stably exhibited by reliably fastening the annular metal seal 10' between the first plane 1a and the second plane 2a.

Other Embodiments

According to the present disclosure, the above-described embodiments may be implemented in the following configuration.

Specifically, in the first embodiment described above, the positioning ring 20 having a larger inner diameter than the outer diameter D1 of the seal body 10a is provided. However, a positioning ring 20 having a smaller outer diameter than an inner diameter of the seal body 10a may be provided to be abutted on an inner-side side wall of the seal groove 4.

In the second embodiment, the positioning protrusion 20' is provided on the outer-diameter-side side surface 10b' of the annular metal seal 10'. However, the positioning protrusion 20' may be provided on the inner-diameter-side surface and may be provided on both the outer-diameter-side and inner-diameter-side side surfaces. In a case where the positioning protrusion 20' is provided on the inner-diameter-side surface, contact with an inner corner R located closer to center of the seal groove 4 can be avoided.

Note that the above-described embodiments are merely preferable examples by nature and are not intended to be particularly limiting the present disclosure, application of the present disclosure, and the scope of use.

What is claimed is:

1. An attachment structure, comprising:
   an annular metal seal;
   a first member having a first planar surface;
   a second member having a second planar surface;
   an annular seal groove recessed in the first planar surface, the seal groove having
      a rounded inner corner portion, and
      a side surface connecting continuously with the inner corner portion; and
   a positioning ring configured to be disposed in the seal groove with the annular metal seal, for positioning the annular metal seal, and be separatable from the annular metal seal, wherein
   the annular metal seal is configured to be fitted in the annular seal groove and is deformable by the first and second members fastened to each other, whereby the first and second member are sealed at the annular metal seal,
   the annular metal seal includes an annular seal body, the seal body having
      a side surface facing the side surface of the annular seal groove, and
      an outer corner portion that is at an end of the side surface of the seal body and that forms a ridge, and
   the positioning ring is configured to be held between the side surface of the seal groove and the side surface of the seal body, and is configured such that the positioning ring abuts on at least a portion of the side surface of the seal groove, whereby the ridge of the seal body is positioned away from the side surface of the seal groove so as to be free of contact with the inner corner portion of the seal groove, when the first member and the second member are fastened with each other, whereby the first and second member are sealed at the annular metal seal.

2. The attachment structure of claim 1, wherein
   a thickness of the positioning ring in a radius direction of the annular metal seal is equal to or larger than a radius of the inner corner portion of the seal groove.

3. The attachment structure of claim 1, wherein
   a height of the positioning ring is equal to or larger than a value obtained by subtracting a radius of the inner corner portion of the seal groove from a depth of the seal groove and is equal to or smaller than 0.75 times a height of the annular metal seal.

4. The attachment structure of claim 1, wherein the positioning ring has a height in a height direction orthogonal to the first planar surface that is greater than a thickness thereof in a radius direction of the annular metal seal.

5. The attachment structure of claim 1, wherein the outer corner portion of the seal body is provided at each of an upper end and a lower end of the side surface thereof facing the positioning ring and an upper end and a lower end of another side surface thereof opposite to the side surface, each outer corner portion forming the ridge, each ridge of each outer corner portion protruding in a height direction orthogonal to the first planar surface.

6. The attachment structure of claim 1, wherein $H0-r0 \leq H2 \leq 0.75H1$, where r0 is a radius of the rounded inner corner portion,
   H0 is a depth of the seal groove,
   H2 is a height of the positioning ring in a height direction orthogonal to the first planar surface, and
   H1 is a maximum height of the annular seal.

7. The attachment structure of claim 1, wherein
   the seal body has opposite planar surfaces parallel to the first planar surface respectively at an upper side thereof and a lower side thereof, and
   in a height direction orthogonal to the first planar surface, the positioning ring has a height that is greater than a distance between the opposite planar surfaces of the seal body.

8. A method of sealing a first member and a second member by an annular metal seal,
   the first member having an annular seal groove recessed in a first planar surface thereof, the seal groove having:
      a rounded inner corner portion, and
      a side surface connecting continuously with the rounded inner corner portion;
   the second member having a second planar surface; and
   the annular metal seal including
      an annular seal body having:
         a side surface, and
         an outer corner portion that is at an end of the side surface of the seal body and that forms a ridge,
   the method comprising:
      preparing a positioning ring having an outer diameter smaller than an inner diameter of the seal body or than an outer diameter of the seal body, the positioning ring being separatable from the annular metal seal;
      fitting the annular metal seal in the seal groove with the positioning ring such that the side surfaces of the annular metal seal and the seal groove face each other and that the positioning ring abuts on at least a portion of the side surface of the seal groove, whereby the ridge of the seal body is positioned away from the side surface of the seal groove, so as to be fee of contact with the inner corner portion of the seal groove; and
      fastening the first member and the second member to each other with the first and second planar surfaces facing each other to deform the annular metal seal, whereby the first and second member are sealed at the annular metal seal.

9. An annular metal seal for an attachment structure that includes
   a first member having an annular seal groove recessed from a first planar surface of the first member, the seal groove having
      a rounded inner corner portion, and
      a side surface connecting continuously with the inner corner portion, and
   a second member having a second planar surface,
   the annular metal seal comprising:
      an annular seal body having:
         a side surface facing the side surface of the annular seal groove, and
         an outer corner portion that is at an end of the side surface of the seal body and that forms a ridge; and
      a positioning protrusion protruding from the side surface of the seal body, for positioning the seal body, the positioning protrusion having a height, in a height direction orthogonal to the first planar surface, that is greater than a protrusion amount of the positioning protrusion from the side surface of the seal body in a radius direction of the annular metal seal, wherein the annular metal seal is configured to be fitted in the annular seal groove and is deformable by the first and second members fastened to each other, whereby the first and second member are sealed at the seal body, the positioning protrusion is configured such that an uppermost end thereof is lower than the first planar surface when the first and second members are fastened to each other, and the positioning protrusion abuts on at least a portion of the side surface of the seal groove, whereby the ridge of the seal body is positioned away from the side surface of the seal groove so as to be free of contact with the inner corner portion of the seal groove, when the first and second members are fastened to each other.

10. The annular metal seal of claim 9, wherein the seal body has an X-shaped cross section, and the positioning protrusion is provided in middle of the side surface of the seal body in the height direction.

11. An attachment structure, comprising:

an annular metal seal;

a first member having a first planar surface;

a second member having a second planar surface; and an annular seal groove recessed in the first planar surface, the seal groove having a rounded inner corner portion, and a side surface connecting continuously with the inner corner portion, wherein the annular metal seal is configured to be fitted in the annular seal groove of the first member, and deformable by the first and second members fastened to each other, whereby the first and second member are sealed at the seal body, the annular metal seal includes an annular seal body having a side surface facing the side surface of the annular seal groove, and an outer corner portion that is at an end of the side surface of the seal body and that forms a ridge, and a positioning protrusion protruding from the side surface of the seal body, for positioning the seal body, the positioning protrusion having a height, in a height direction orthogonal to the first planar surface, that is greater than a protrusion amount of the positioning protrusion from the side surface of the seal body in a radius direction of the annular metal seal, the positioning protrusion is configured such that an uppermost end thereof is lower than the first planar surface when the first and second members are fastened to each other, and the positioning protrusion abuts on at least a portion of the side surface of the seal groove, whereby the ridge of the seal body is positioned away from the side surface of the seal groove so as to be free of contact with the inner corner portion of the seal groove when the first member and the second member are fastened with each other whereby the first and second members are sealed at the seal body.

12. The attachment structure claim 11, wherein the protrusion amount of the positioning protrusion in the radius direction of the annular metal seal is equal to or larger than a radius of the inner corner portion of the seal groove.

13. The attachment structure of claim 11, wherein the height of the positioning protrusion is equal to or larger than a value obtained by subtracting twice a radius of the inner corner portion of the seal groove from a height of the annular metal seal and is equal to or smaller than 0.75 times the height of the annular metal seal.

14. The attachment structure of claim 11, wherein the outer corner portion of the seal body is provided at each of an upper end and a lower end of the side surface thereof facing the positioning protrusion and an upper end and a lower end of another side surface thereof opposite to the side surface, each outer corner portion forming the ridge, each ridge of each outer corner portion protruding in the height direction.

15. The attachment structure of claim 11, wherein $H1-2r0 \leq H3 \leq 0.75H1$, where $r0$ is a radius of the rounded inner corner portion, $H1$ is a maximum height of the annular seal, and $H3$ is a height of the positioning protrusion.

16. The attachment structure of claim 11, wherein the seal body has opposite planar surfaces parallel to the first planar surface respectively at an upper side thereof and a lower side thereof, and the height of the positioning protrusion is greater than a distance between the opposite planar surfaces of the seal body.

17. A method of sealing a first member and a second member by an annular metal seal, the first member having an annular seal groove recessed in a first planar surface thereof, the seal groove having a rounded inner corner portion, and a side surface connecting continuously with the inner corner portion;

the second member having a second planar surface; and the annular metal seal including an annular seal body having a side surface, and an outer corner portion that is at an end of the side surface of the seal body and that forms a ridge, and a positioning protrusion protruding from at the side surface of the seal body, and for positioning the seal body, the positioning protrusion having a height, in a height direction orthogonal to the first planar surface, that is greater than a protrusion amount of the positioning protrusion from the side surface of the seal body in a radius direction of the annular metal seal, the method comprising:

fitting the annular metal seal in the seal groove such that the side surfaces of the seal body and the seal groove face each other and that the positioning protrusion abuts on at least a portion of the side surface of the seal groove, whereby the ridge of the seal body is positioned away from the side surface of the seal groove so as to be free of contact with the inner corner portion of the seal groove; and fastening the first member and the second member to each other with the first and second planar surfaces facing each other to deform the annular metal seal, whereby the first and second member are sealed at the seal body.

* * * * *